United States Patent

[11] 3,547,010

[72] Inventors: Max Gennerich;
Walter Paul, Lengerich of Westphalia;
Willy Niemeyer, Natrup-Hagen; Fritz
Achelpohl, Lengerich of Westphalia,
Germany
[21] Appl. No. 731,775
[22] Filed May 24, 1968
[45] Patented Dec. 15, 1970
[73] Assignee Windmoller & Holscher
Lengerich of Westphalia, Germany
[32] Priority June 19, 1967
[33] Germany
[31] No. W44202

[54] APPARATUS FOR PULLING OPEN AND
FLATTENING CROSSED END PORTIONS IN THE
MANUFACTURE OF CROSSED END BAGS FROM
PLASTICS MATERIAL SHEETING
8 Claims, 6 Drawing Figs.

[52] U.S. Cl. .................................................. 93/22, 93/28
[51] Int. Cl. .................................................. B31b 1/60
[50] Field of Search ...................................... 93/8(Inquired), 21, 22, 27, 28, 35RB

[56] References Cited
UNITED STATES PATENTS
2,707,421  5/1955  Rawe............................ 93/28
2,888,859  6/1959  Dambacher................... 93/28
3,326,094  6/1967  Camerini....................... 93/28
3,446,121  5/1969  Achelpohl..................... 93/28
FOREIGN PATENTS
912,045  5/1954  Germany....................... 93/28

Primary Examiner—H. A. Kilby, Jr.
Attorney—Fleit, Gipple & Jacobson

ABSTRACT: Tube sections of plastics material are conveyed in a transverse direction. A vacuum is applied to the end edges of the tube plies substantially throughout the length of the edges by vacuum tools which move at the same speed as the tube sections so that the plies are pulled apart in opposite directions and the tube section end portions are opened. Spreading means are introduced into the opened tube sections approximately as far as to the center fold line of the end portion without contacting the tube section and during their subsequent spreading movement spread the tube plies apart in the end portion of the tube section. The end portion folds are subsequently formed and fixed.

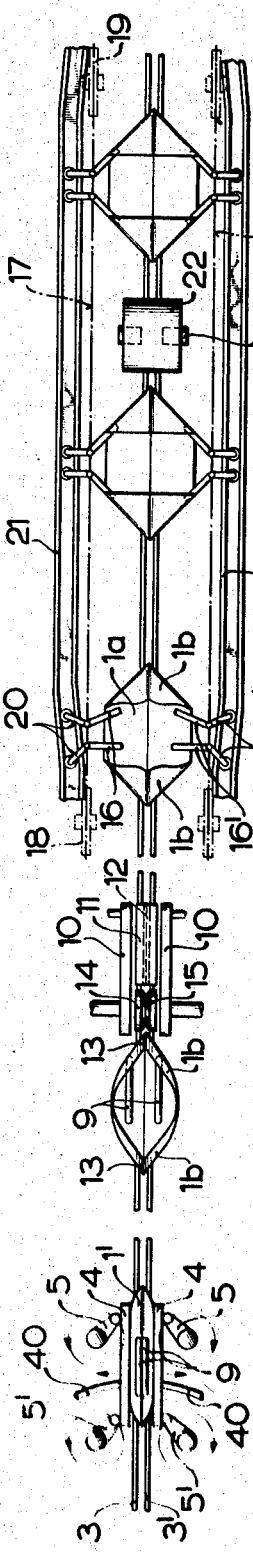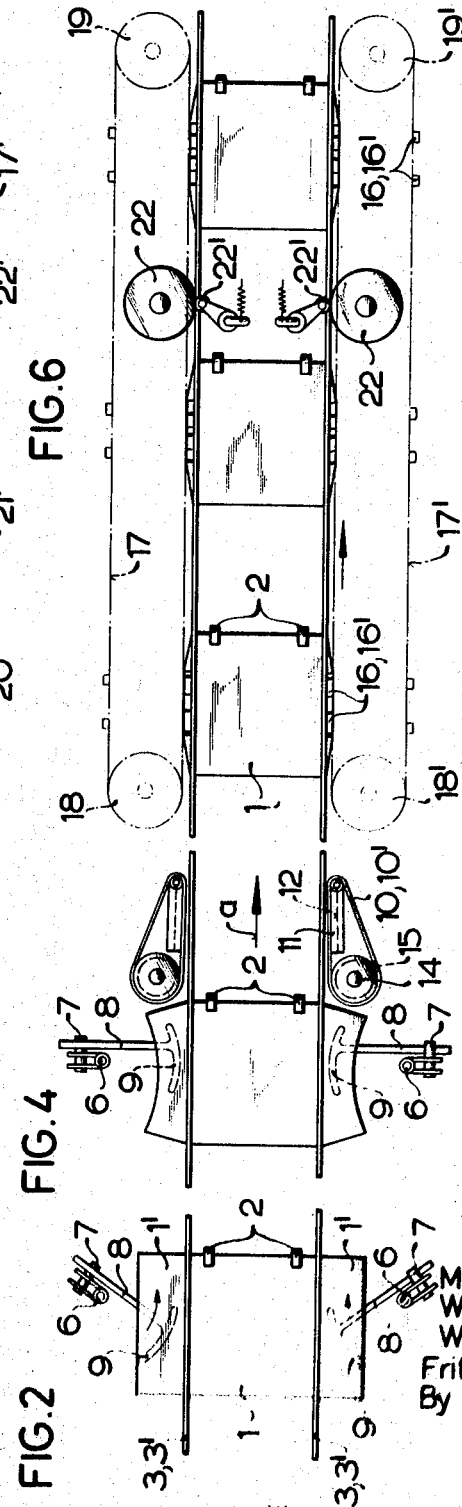

APPARATUS FOR PULLING OPEN AND FLATTENING CROSSED END PORTIONS IN THE MANUFACTURE OF CROSSED END BAGS FROM PLASTICS MATERIAL SHEETING

Great difficulties are involved in the processing of plastics material sheeting to bags having folded ends, particularly crossed ends, on automatic bagmaking machines. These difficulties are due to special physical properties of plastics material sheeting. Contrary to paper, plastics material sheeting is soft and pliable and has a certain elastic toughness. Above all, it lacks the stiffness which causes paper to retain a fold once it has been formed. A fold in plastics material sheeting can easily be displaced subsequently and the folded portions tend to eliminate the the fold and to return to their original position. The undesirable results of this property are aggravated by the low coefficient of friction between plies of plastics material sheeting in sliding contact and by the relatively high coefficient of friction between metal and plastics material sheeting. The high pliability in conjunction with the high coefficient of friction to the metal of the processing tools results in difficulties in all folding operations by which upsetting forces are applied to the sheeting. Under such action, the sheeting can gather in random folds so that unusable bags result. The difficulties which have been described are greatly increased by the high production speeds required in the automatic manufacture of bags.

For the reasons described hereinbefore, it has been found that processes and apparatus for pulling open and fixing crossed ends, such as are disclosed in the German Pat. Specification Nos. 714,028; 803,627; and 822,933; cannot be satisfactorily employed in the manufacture of crossed end bags from plastics material sheeting because the use of the known processes and apparatus involves an alternation of upsetting and tensile forces applied to the plastics material sheeting and the elimination of the folds, once they have been formed, is not opposed. Such opposing action was not required in the manufacture of paper bags, as has been mentioned.

It is an object of the invention to provide a process and means for carrying out such process so as to enable at high production speeds a reliable pulling open and flattening of crossed end portions of bags made from plastics material sheeting.

To accomplish this object it is proposed according to the invention that a vacuum is applied to the edges of the tube plies substantially throughout the length of the edges by vacuum tools which move at the same speed as the tube sections so that the plies are pulled apart in opposite directions and the tube section end portions are opened, spreading means are introduced into the opened tube sections approximately to the center fold line of the end portion without contacting the tube section and during their subsequent spreading movement spread the tube plies apart in the end portion of the tube section, whereafter the end portion folds are formed and fixed.

Because a vacuum is applied to the edges of the tube section from the outside and they are not opened with the aid of grippers inserted into the opening, and because the vacuum tools move at the same linear speed and in the same direction as the tube sections, pushing forces will not occur during the opening operation. As the spreading means are introduced as far as to the center fold line of the end portion without contacting the tube section and perform the spreading operation only while they are subsequently moved out of the tube section, no pushing forces will be applied also in this phase of the process. It has been found that the difficulties which have previously been encountered can thus be avoided.

In a development of the invention, it will be suitable if the spreading means merely initiate the flattening of the crossed end portions whereas said flattening is continued by pressure-applying means which succeed the spreading means, and is completed by pairs of folding members, known per se, which are advanced at the speed of travel of the bags and pivotally moved into the open corners of the triangular pockets of the end portion and exactly straighten the end portion triangles and hold them straightened whereas the end portion triangles are fixed at the same time. This development of the process according to the invention is based on the recognition that a point engagement by tools must be avoided, owing to the high pliability of the plastics material sheeting, and only relatively low tool speeds are permissible in order to avoid uncontrolled movements of the sheeting and that, furthermore, sharp folds can be formed only when the sheeting is exactly straightened at the same time. Because the spreading tools, pressure-applying members and pairs of folding members are arranged in succession, the entire flattening operation is performed within a longer time so that none of said tools is used with accelerations and at speeds which are not permissible for plastics material sheeting. The sharp folds required in the crossed end portions are finally formed while the folds are exactly fixed in position by the pairs of folding members so as to prevent any movement of said folds.

In the practice of the process according to the invention it has been found that it enables a processing of plastics material sheeting to satisfactory bags at the production speeds which are usual with paper webs, in spite of the above-mentioned properties of plastics material sheeting. The apparatus which is suitable for carrying out the process comprises a plurality of processing stations, through which the tube sections of plastics material are transversely conveyed. The apparatus according to the invention essentially consists of:

a. elongated, flat vacuum tools, which move in the same direction and at the same speed as the tube sections and serve to open the tube section end portions throughout the width thereof;

b. spreading tools, which are known per se and adapted to be moved into the tube section openings and controlled in such a manner that the spreading movement does not begin until the spreading tools have been introduced approximately as far as to the center fold line of the tube section end portion;

c. revolving pressure-applying members for continuing the operation of flattening the crossed end portion, which members consist preferably of at least two parallel, revolving guide belts adjacent to the two free ends of the crossed end portion, which pressure-applying members approach said crossed end portion in the direction of travel at an acute angle and revolve in the direction of travel of the bags; and d. pairs of folding members, known per se, which revolve on chains and serve to straighten the crossed end portion, and means which are disposed in the range of action of the pairs of folding members and serve to fix the triangular pockets of the crossed end portions which have been formed.

The vacuum tools may consist of pairs of vacuum bars, which are moved by parallel cranks, or of revolving endless vacuum belts, which extend over vacuum boxes and are provided with vacuum holes. In both cases, different from revolving vacuum tubes or the like, such a movement of the vacuum tools can be ensured that the velocity component in the direction of travel of the tube sections is at least approximately the same as the speed of travel of said tube sections.

To enable a simultaneous spreading of the tube section ends substantially throughout their width, the spreading tools, known per se, are preferably provided at their ends with arcuate transverse extensions. The arcuate shape facilitates the introduction of the rotating spreading tools into the opened tube section ends and the withdrawal of the spreading tools from the spreaded tube section ends.

According to another desirable suggestion a guide bar having a guide groove is provided between the revolving guide belts and said groove is triangular in cross section and extends parallel to the guide belts and serves to guide the projecting side folds of the tube at the end portion triangles. In conjunction with the guide belts, the guide bar retains the end portion folds which have been initially formed by the spreading operation, and the guide groove for the protruding side folds prevents a running of the side folds against the guide bar and consequently an obstruction to the further conveyance of the bags. The guide bar may be preceded by a guide roller, which rotates in the direction of travel and is formed at its periphery with a guide groove, which extends in the plane of the guide groove of the guide bar and is also triangular in cross section.

Finally, it is desirable according to the invention to provide pinch rolls, which are disposed in the range of movement of the pairs of folding members and serve to fix the triangular pockets by sharply folding the same. Alternatively, other means may be used for holding the triangular pockets in position e.g., heat sealing means for firmly joining the two plies of the triangular pockets by heat sealing outside the fold lines for the end portion side flaps.

The invention will be explained more fully hereinafter with reference to the drawing, in which:

FIGS. 1 and 2 are, respectively, a side elevation and top plan view showing the opening of the tube section ends and the noncontacting introduction of the spreading tools into the tube opening;

FIGS. 3 and 4 are, respectively, a side elevation and a top plan view illustrating the beginning of the spreading of the tube opening; and FIGS. 5 and 6 are also a side elevation and a top plan view, respectively, showing the completion of the flattening of the tube opening by an exact straightening of the end portion triangles and a sharp folding of the triangular pockets.

Individual tube sections 1 are exactly straightened and advanced in a flat condition by the grippers 2 in the direction of the arrow a between lateral pairs of guide rails 3, 3', which may be coated with teflon to reduce friction. Those end portions 1' of the tube sections which are to be folded into crossed end portions protrude outwardly from the pairs of guide rails 3, 3' and are thus fed to various processing tools.

The tube section end portions 1' first enter the range of pairs of vacuum bars 4, which are pivoted to pairs of parallel cranks 5, 5' to perform parallel circular movements, which are indicated in dash-dot lines. The circular movement causes the vacuum bars to approach the tube section end portions from below and above so that the vacuum is applied to said end portions almost throughout the width thereof and said end portions are opened in their full width while the circular movement proceeds, as is shown in FIG. 1. The vacuum bars are elongated hollow bodies, which are formed with a series of vacuum holes in that wall which faces the tube section end portion. The cavity of each vacuum bar is connected in known manner by a flexible tube 40 and a control valve to a vacuum pump. The orbital speed of travel of the vacuum bars 4 is so adjusted to the speed of travel of the tube sections that the velocity component of the vacuum bars in the direction of travel of the tube sections approximately agrees with the speed of travel of the tube sections while the tube sections are being opened. To this end, the means for driving the vacuum bars may include transmissions, such as a sliding crank or elliptical wheels, whereby the orbital speed of the vacuum bars is so changed during the operation of opening the end portions of the tube section that the desired result is obtained. It has been emphasized hereinbefore that the pairs of vacuum bars 4 may be replaced by revolving vacuum belts.

Spreading tools 7, which are known per se (see German Pat. Specification No. 803,627) and rotatable on shafts 6, are provided in the range of action of the pairs of vacuum bars 4. As is indicated in FIGS. 1 and 2, the tube section end portions opened by the vacuum bars are entered by the spreading jaws 8 of the spreading tools 7 as far as to the center fold lines of the end portions of the tube section 1 while the jaws are in a closed position. The center fold lines of the end portions are defined by the pairs of guide rails 3, 3'. The spreading jaws 8 are provided at their free ends with transverse extensions 9 in the form of an arc of a circle. A spreading movement at right angles to the plane of the drawing is imparted to the jaws 8 in known manner by pusher cams, which are so designed in the present case that a spreading movement will not be performed until the spreading jaws begin their movement out of the opened tube section, as is shown in FIGS. 3 and 4. During the spreading operation, the transverse extensions 9 of the spreading jaws engage the open end portions of the tube section over a large width and wipe over the 10, 10' of the tube section from the inside outwardly. The frictional forces which are thus exerted give rise only to tensile forces in the sheeting and these tensile forces in conjunction with the fact that the sheeting is contacted in a large width by the transverse extensions 9 prevent any undesired movement of the sheeting.

When the flattening of the crossed end portions has been initiated by the spreading jaws 8, it is continued by laterally disposed guide belts 10, 10', which revolve in the direction of travel while the tube section is being advanced. As is apparent from FIG. 4, the guide belts 10, 10' approach the crossed end portions in the direction of travel at an acute angle thereto and engage each crossed end portion at its two free ends. A guide bar 11 is disposed between the guide belts 10, 10' and is formed with a guide groove 12, which is triangular in cross section and extends parallel to the guide belts in the plane of the tube section 1. The groove 12 serves to guide the projecting side folds 13 of the tube section at the triangles 1b of the crossed end portion. The guide bar 11 is preceded by a guide roller 14, which rotates in the direction of travel and is formed in its periphery with a triangular guide groove 15, which is also triangular in cross section and lies in the plane of the guide groove 12. When the crossed end portion is being formed, its sharply folded side folds 13 enter the revolving guide groove 15, which reliably directs the side folds into the guide groove 12 of the guide bar 11. This results in an exactly central support and guidance of the still loose crossed end portion while the guide belts 10, 10' proceed with flattening the end portion.

The crossed end portion is still guided by the guide belts 10, 10' and the guide bar 11 when it enters the range of pairs of folding members 16, 16', which are known in arrangement and mode of operation (German Pat. Specification No. 822,933). As is apparent from FIGS. 5 and 6, the pairs of folding members are pivoted to chains 17, 17', which are trained around sprockets 18, 19, 18', 19' rotating at the speed of travel about axes which are at right angles to the plane of the tube section 1. The entire arrangement is such that the chain course moving in the direction of travel extends parallel to the pairs of guide rails 3, 3' so that the pairs of folding members 16, 16' bear on the quadrangular region 1a of the still loose crossed end portion, as is shown on the left in FIG. 5. The quadrangular region 1a is left exposed by the triangular pockets. The folding members 16, 16' are provided with control levers 20, 20', which engage stationary guide rails 21, 21'. These are shaped to impart to the advancing folding members a laterally directed pivotal movement so that the folding members enter the open ends of the triangular pockets 1b of the end portions and exactly straighten and stretch said pockets under tensile stress. This is shown on the right in FIG. 5. The flattening and straightening of the entire crossed end portions has thus been completed. To fix the folds in the crossed end portions, pinch rolls 22, 22' are disposed in the range of movement of the pairs of folding members 16, 16' and effect a sharp folding of the end portion triangles while the crossed end portions are still held exactly straightened by the pairs of folding members. During the fixation of the folds by the pinch rolls 22, 22', any shifting which might occur in the crossed end portions owing to the special physical properties of the plastics material sheeting will thus be prevented.

The folding members 16, 16' may consist of thin, hard steel flats, and the pinch rolls 22, 22' may extend throughout the width of the crossed end portions to act on all folds of the end portions. In most cases, however, it will be sufficient if the pinch rolls have only such a width that they act on the central portion of the end portion triangles 1b, which central portion does not lie within the range of the folding members. This is shown in FIG. 5. In this case, the folding members may consist of thicker flat steel, which prevents uncontrolled resonant vibration of the folding members at high production speeds.

We claim:

1. Apparatus for pulling open and flattening end portions of flattened tube sections of plastics material in the manufacture of crossed bag bottoms, wherein said tube sections are conveyed in a direction transverse to their longitudinal axis along a predetermined path of travel, comprising:
   a. elongated, flat vacuum tools movable in the same direction and at the same speed as said tube sections for opening said tube section end portions throughout the width thereof;
   b. spreading tools movable into each of said opened tube section end portions and controllable such that their spreading movement begins only after their introduction approximately down to the center fold line of each said end portion;
   c. revolving pressure-applying means situated in the path of travel of said spreaded end portions for flattening the latter;
   d. pairs of folding members revolving on chains for straightening said flattened end portions; and
   e. means to fix the triangular pockets of said flattened end portions, said fixing means being disposed in the range of action of said pairs of folding members.

2. Apparatus according to claim 1, characterized in that the vacuum tools consist of pairs of vacuum bars, which are moved by parallel cranks.

3. Apparatus according to claim 1, characterized in that the vacuum tools consist of revolving endless vacuum belts which extend over vacuum boxes and are formed with vacuum holes.

4. Apparatus according claim 1, characterized in that the spreading tools are provided at their ends with arcuate transverse extensions.

5. Apparatus as described in claim 1, wherein said pressure-applying means comprise at least tow parallel guide belts approaching said spreaded end portions in the direction of travel of the latter at an acute angle and revolving in the direction of travel of said tube sections.

6. Apparatus as described in claim 5, further comprising a guide bar provided between said guide belts and having a guide groove triangular in cross section and extending parallel to said guide belts, said groove being adapted to guide the projecting side folds of the tube at said spreaded end portions.

7. Apparatus according to claim 6, characterized in that the guide bar is preceded by a guide roller which rotates in the direction of travel and is formed at its periphery with a guide groove, which extends in the plane of the guide groove of the guide bar and is also triangular in cross section.

8. Apparatus as described in claim 1, wherein said fixing means comprise at least two pinch rolls.